(12) United States Patent
Halford

(10) Patent No.: US 10,471,494 B2
(45) Date of Patent: Nov. 12, 2019

(54) TOOL TEMPERATURE CONTROL

(75) Inventor: Ben Halford, Oakham (GB)

(73) Assignee: SURFACE GENERATION LIMITED, Rutland (GB)

( * ) Notice: Subject to any disclaimer, the term of this patent is extended or adjusted under 35 U.S.C. 154(b) by 1194 days.

(21) Appl. No.: 14/236,253

(22) PCT Filed: May 18, 2012

(86) PCT No.: PCT/GB2012/051128
§ 371 (c)(1),
(2), (4) Date: Jul. 23, 2014

(87) PCT Pub. No.: WO2013/021164
PCT Pub. Date: Feb. 14, 2013

(65) Prior Publication Data
US 2014/0326035 A1    Nov. 6, 2014

(30) Foreign Application Priority Data
Aug. 8, 2011 (GB) .................................. 1113658.7

(51) Int. Cl.
*B21D 37/16* (2006.01)
*B29C 35/00* (2006.01)
*B29C 35/04* (2006.01)
*B29C 33/04* (2006.01)

(52) U.S. Cl.
CPC ............ *B21D 37/16* (2013.01); *B29C 33/046* (2013.01); *B29C 35/00* (2013.01); *B29C 35/045* (2013.01); *B29C 2035/046* (2013.01)

(58) Field of Classification Search
CPC ......... B21D 37/16; B29C 33/02; B29C 33/04; B29C 33/046; B29C 33/048; B29C 43/52; B29C 2043/522; B29C 2043/525; B29C 2043/527; B29C 51/42; B29C 51/421; B29C 51/424; B29C 51/425; B29C 51/427; B29C 51/428
See application file for complete search history.

(56) References Cited

U.S. PATENT DOCUMENTS 2,493,439 A    1/1950   Braund
2,689,372 A    9/1954   Goulding et al.
(Continued)

FOREIGN PATENT DOCUMENTS

EP    0048772 A1 *  4/1982    ............ B23K 1/012
EP    0261278 A1    3/1988
(Continued)

OTHER PUBLICATIONS

Machine Translation of EP 0048772, Translated Apr. 18, 2019, 2 Pages. (Year: 1982).*
(Continued)

*Primary Examiner* — Gregory D Swiatocha
(74) *Attorney, Agent, or Firm* — Young Law Firm, P.C.

(57) ABSTRACT

A tool element assembly (100) has a tool element (102) with a tool surface (110) and a control surface (112) opposite the tool surface. A thermal control structure (104) is provided defining a flow chamber (103) partially bounded by the control surface, and having an inlet (148) and an outlet (121) which control chamber diverges towards the control surface.

22 Claims, 9 Drawing Sheets

(56) References Cited

U.S. PATENT DOCUMENTS

| | | | | |
|---|---|---|---|---|
| 3,119,681 | A | * | 1/1964 | Vogelpohl ............... C03B 11/02 65/356 |
| 3,167,811 | A | * | 2/1965 | Kraus .................... B29C 33/04 264/517 |
| 4,016,231 | A | * | 4/1977 | Hawkins ................ B29C 51/36 264/322 |
| 4,059,426 | A | * | 11/1977 | Starr ...................... C03B 29/12 65/114 |
| 4,059,427 | A | * | 11/1977 | Starr ...................... C03B 29/12 65/114 |
| 4,067,711 | A | * | 1/1978 | Jones .................... C03B 9/3875 65/267 |
| 4,500,277 | A | * | 2/1985 | Bullock ................. B29C 51/04 264/522 |
| 4,621,995 | A | * | 11/1986 | Wersosky ............ B29C 33/046 137/625.33 |
| 4,851,177 | A | * | 7/1989 | Gray .................... B29C 33/046 264/297.6 |
| 4,890,995 | A | * | 1/1990 | Gray .................... B29C 33/046 264/301 |
| 5,178,814 | A | * | 1/1993 | Lemond ............. B29C 47/0014 264/211.15 |
| 5,443,777 | A | * | 8/1995 | Mills .................... B29C 33/046 264/255 |
| 5,445,510 | A | | 8/1995 | Jackson, Jr. |

FOREIGN PATENT DOCUMENTS

| | | | | |
|---|---|---|---|---|
| EP | | 1749632 A1 | 2/2002 | |
| GB | | 708342 A | * 5/1954 | ............ B29C 43/12 |

OTHER PUBLICATIONS

Search Report Under Section 17 dated Dec. 7, 2011 in related GB1113658.7.

International Search Report dated Feb. 14, 2013 in related PCT application PCT/GB2012/051128.

Written Opinion of the International Searching Authority dated Feb. 16, 2013 in related PCT application PCT/GB2012/051128.

USPTO Office Action dated Dec. 13, 2016 in U.S. Appl. No. 14/357,333.

* cited by examiner

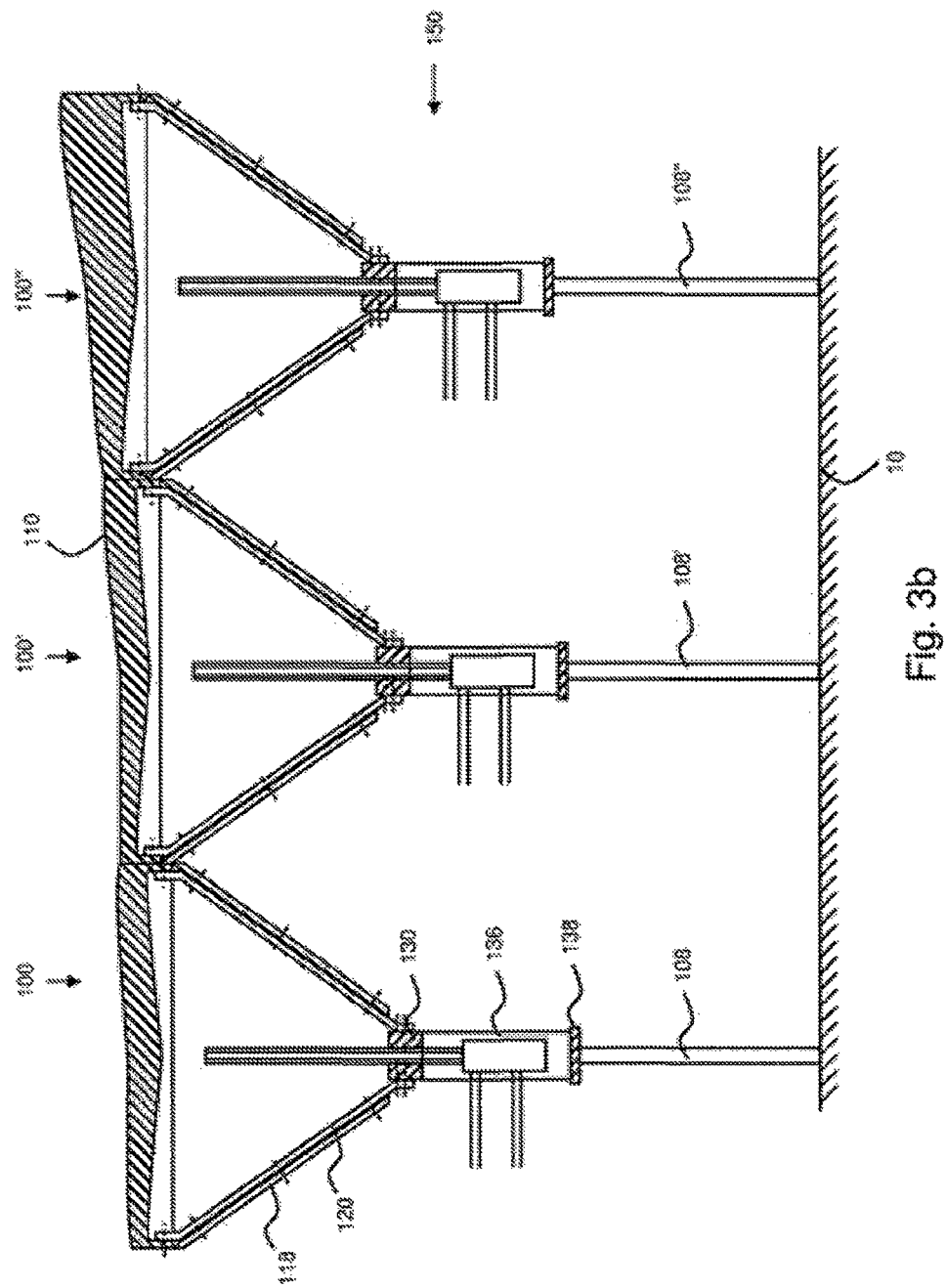

TOOL TEMPERATURE CONTROL

The present invention is concerned with a tool element assembly for controlling the temperature of a tool face. More specifically, the present invention is concerned with the provision of an assembly which provides an independently controllable fluid chamber to control the temperature of a zone of a tool face whilst minimising influence from adjacent zones.

Manufacturing tools or patterns are well known in the art for forming workpieces constructed from metal, plastic or composite materials. In particular, the applicant's prior published patent application, WO02/064308, discloses a system whereby a reconfigurable series of tool pins, or elements, can be raised or lowered and subsequently machined to the desired profile of the workpiece.

It is desirable during forming of a workpiece on such a tool to be able to control the temperature of the tool, for example, if "out-of-autoclave" composite curing is desired. In addition, it is also desirable to be able to independently control different areas of the tool face and thereby influence the material properties of the workpiece across the surface of the tool. For example the user may want to form a workpiece being stiff in one area, but flexible in another (e.g. for a film hinge).

The applicant's prior applications published as WO2006/067447 and WO2011/015823 discuss the potential for supplying heating or cooling fluid into individual tool pins to selectively heat and/or cool them. A problem with such a system is that the pins are formed from bulky metal blocks with channels formed therein and are therefore of a high thermal inertia (meaning that they take time to heat and/or cool). Furthermore each pin either contacts, or is very close to the adjacent pins across a significant area (meaning that the heating/cooling of one pin will affect adjacent pins, which is undesirable).

Accordingly, it is an aim of the present invention to provide an improved tool element assembly.

According to a first aspect of the invention there is provided a tool element assembly comprising: a tool element having a tool surface, and a control surface opposite the tool surface, a thermal control structure defining a fluid chamber partially bounded by the control surface, and having an inlet and an outlet, in which the fluid chamber diverges towards the control surface.

Advantageously, the use of the structure defining a fluid flow chamber bounded by the control surface allows the operator to flood the chamber with a fluid of appropriate temperature. Because of the high contact area with the control surface of the element, and the flow of fluid thereover, the system has a low thermal inertia which enables rapid changes in temperature thereby allowing greater control over the manufacturing process.

Further, the divergent nature of the chamber allows adjacent chambers to be thermally isolated. Because of the divergent nature of the chambers, adjacent chambers can be formed with a large space therebetween. Therefore each zone will be influenced by adjacent zones by a lesser extent than in the prior art.

By "divergent" we mean increasing in cross sectional area approaching the control surface. For example, step changes in cross sectional area may occur. Such divergence need not be gradual (e.g., tapered), although this is preferable. Plural inputs may be provided which diverge towards the control surface.

Preferably the inlet is positioned closer towards the control surface than the outlet. This minimises contact of the incoming fluid with the fluid in the chamber, preventing undesirable heating and/or cooling.

In order to achieve this, the inlet may be defined by a pipe extending into the flow chamber. In this way, the outlet may be formed proximate the entry point of the pipe.

The pipe may axially adjustable relative to the control surface.

Preferably the pipe is directed towards the control surface. This provides an impinging jet for maximum heat transfer to the control surface.

Preferably the structure defines a load path for supporting the tool element. This allows the loads on the tool during the manufacturing operation to be reacted. Preferably the load path diverges towards the tool element to support the tool element proximate its periphery. This allows the fluid to access the control surface of the tool uninhibited.

Preferably the thermal control structure comprises at least one plate defining the flow chamber. A plate like structure is light, inexpensive and has a high thermal agility. The plates may be constructed from an insulating material.

Preferably the load path comprises a load beam in contact with the at least one plate. The plates can thereby be supported in position with no additional structure.

Preferably the inlet is directed towards a target position on the control surface, and the tool element has a thickness tapering away from the target position. This mitigates hot cold spots from occurring in the centre of the element—the area which is exposed to the highest heat transfer coefficient from the impinging jet of fluid is made thicker to intentionally slow its change in temperature to match the surrounding parts of the element which experience lower heat transfer coefficients.

Preferably the control surface has features defined thereon to increase its surface area. This increases the thermal agility of the element.

The features may be protrusions. The protrusions may be reactive to a fluid flow thereon to move relative to the control surface. Alternatively the protrusions may be reactive to temperature to move relative to the control surface.

According to a second aspect of the invention there is provided a tool element assembly comprising:
 a tool element having a tool surface, and a control surface opposite the tool surface,
 a thermal control structure defining a fluid chamber partially bounded by the control surface,
 in which the control structure is constructed from one or more panels.

By "panels" we mean thin walled sections of material, for example in which the aspect ratio of thickness to minimum length is at least 20:1. Beneficially, using thin panels of heat resistant material provides the best thermal agility for the system (because very little thermal energy is stored by the panels).

In other words, the invention utilises a thin walled enclosure which is supported by a skeletal structure.

Preferably the control structure comprises at least one support member arranged to form a load path for loads incident on the tool element.

One or more baffles may be positioned within the fluid chamber arranged to control the course of flowing fluid within the chamber. The baffle position may be adjustable.

Preferably at least one baffle is positioned within the fluid chamber to define a flow path diverging towards the tool element.

According to a third aspect of the invention there is provided a tool comprising a plurality of element assemblies according to the first or second aspect, in which the tool elements of the tool element assemblies tessellate to define a tool face.

According to a fourth aspect of the invention there is provided a method of manufacturing a workpiece comprising the steps of:
providing a tool element assembly according to the first or second aspect, providing an opposing tool element,
forming a workpiece between the tool element and the opposing tool element.

An example tool element in accordance with the present invention will now be described with reference to the appended figures in which:

FIG. 3b is a side-section view of a second tool comprising a plurality of tool elements in accordance with FIGS. 1 and 2;

Figure 1:
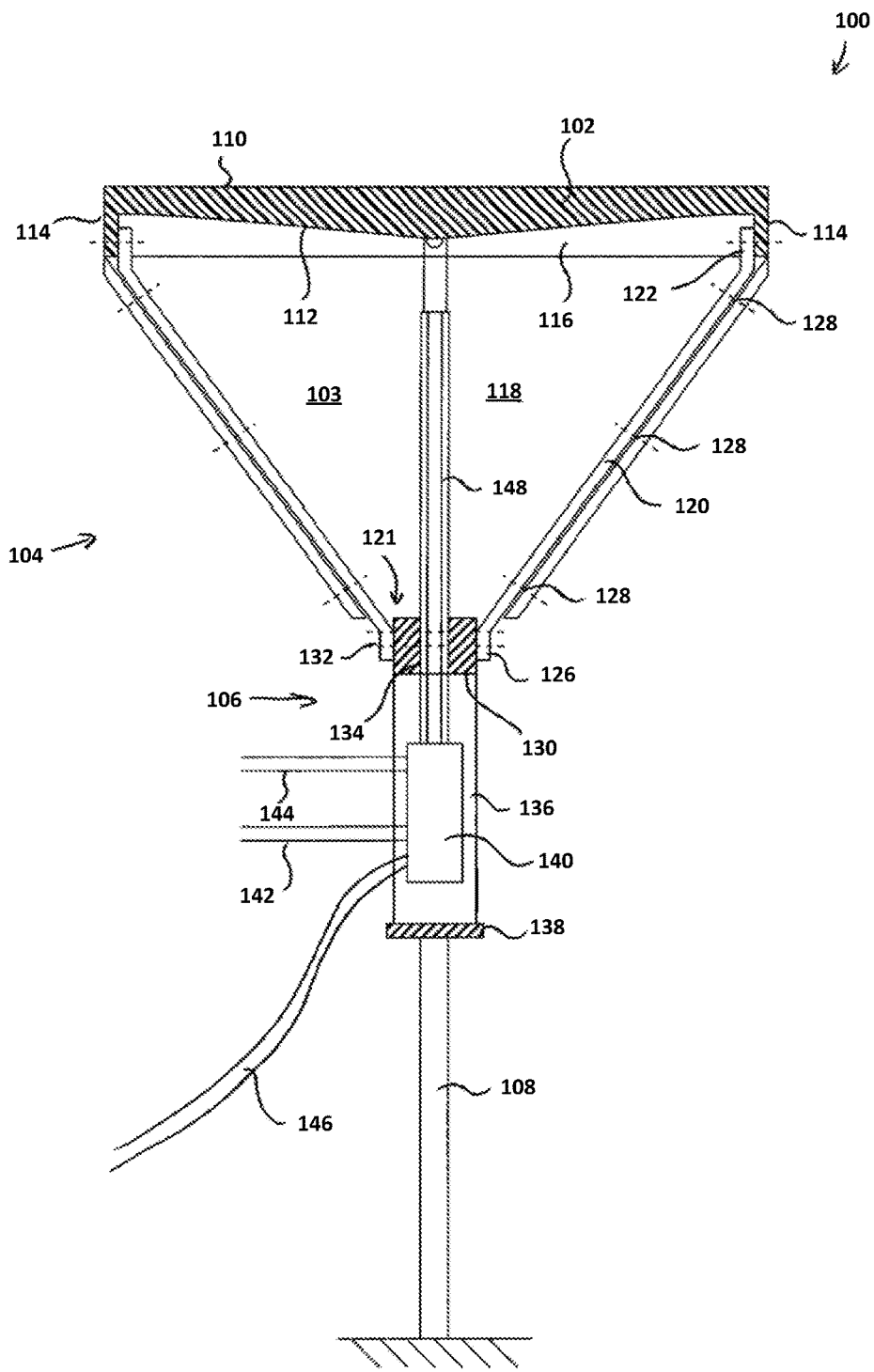
FIG. 1 is a side section view of a first tool element in accordance with the present invention.

Turning to FIG. 1, the tool element 100 comprises a tool block 102, a support structure 104, a thermal control assembly 106 and a support rod 108.

The tool block 102 is a generally plate-like structure having a tool surface 110 on a first side and a temperature control surface 112 opposite the tool surface 110. The tool block 102 is generally rectangular in shape and has a downwardly extending side walls 114 surrounding the periphery of the tool block 102 and extending away from the tool surface 110. The projection of the side walls 114 from the temperature control surface 112 forms a tool block cavity 116. The temperature control surface 112 is contoured such that the tool block cavity 116 is shallower in the centre of the tool block 102 than at the sides proximate the side walls 114. In other words, for a flat tool surface 110, the tool block 102 is thicker in the middle of the tool block 102 than at the edges proximate the side walls 114. The thickness tapers towards the periphery of the tool block 102.

A thermocouple (not shown) is positioned within the tool block 102 in order to measure the temperature of the block 102 (preferably near the tool face 110). Control of the face temperature is achieved using this thermocouple.

The support structure 104 comprises four generally triangular plates 118. The plates are arranged such that their edges touch forming a plenum 103. Each plate 118 has a truncated lower end 119 such that an exhaust orifice 121 is formed at their base. At the centre of each of these triangular plates 118 is a load beam 120 which comprises a first attachment flange 122 for attachment to a relevant side wall 114 of the tool block 102m the first flange 122 extends into an elongate axial load bearing beam 124 terminating in a second flange 126. Along the length of the beam 124, a plurality of mechanical fasteners 128 secure it to the relevant triangular plate 118. The plates 118 extend to meet the side walls 114 of the tool block 102, but stop short such that an area of the sidewalls 114 forms a part the plenum 103 for reasons described below.

Each of the four load beams 120 attaches to a collar 130 via mechanical fasteners 132. The collar 130 is generally cylindrical, having a central through bore 134.

A pair of support bars 136 are attached to the collar 130 and terminate in a support flange 138. It will be noted that the second support bar 136 is provided but is not visible in FIG. 1.

The support rod 108 extends downwardly from the support flange 138.

The thermal control assembly 106 comprises an electrical resistive air heater 140 having a heater component and a temperature sensor. The heater component is controlled by a power supply 142 and the temperature of the heater 140 is measured by a control line 144. Air is supplied to the heater 140 through an air line 146 connected to an air pump or pressurised air source and is heated. A hot air output from the heater 140 enters a hot air tube 148 which extends through the collar 130 and is fastened thereto, in this instance by the fasteners 132 which pass all the way through the assembly of the collar 130, two of the second flanges 126 of the load beams 120 and the hot air tube 148. The heater 140 is controllable to provide the required fluid temperature, and may be deactivated completely to provide a cooling (ambient temperature) air flow.

The hot air tube 148 extends towards the tool block 102 and is directed to the central point of the temperature control surface 112 such that fluid passed therethrough impinges on that surface.

Figure 2:
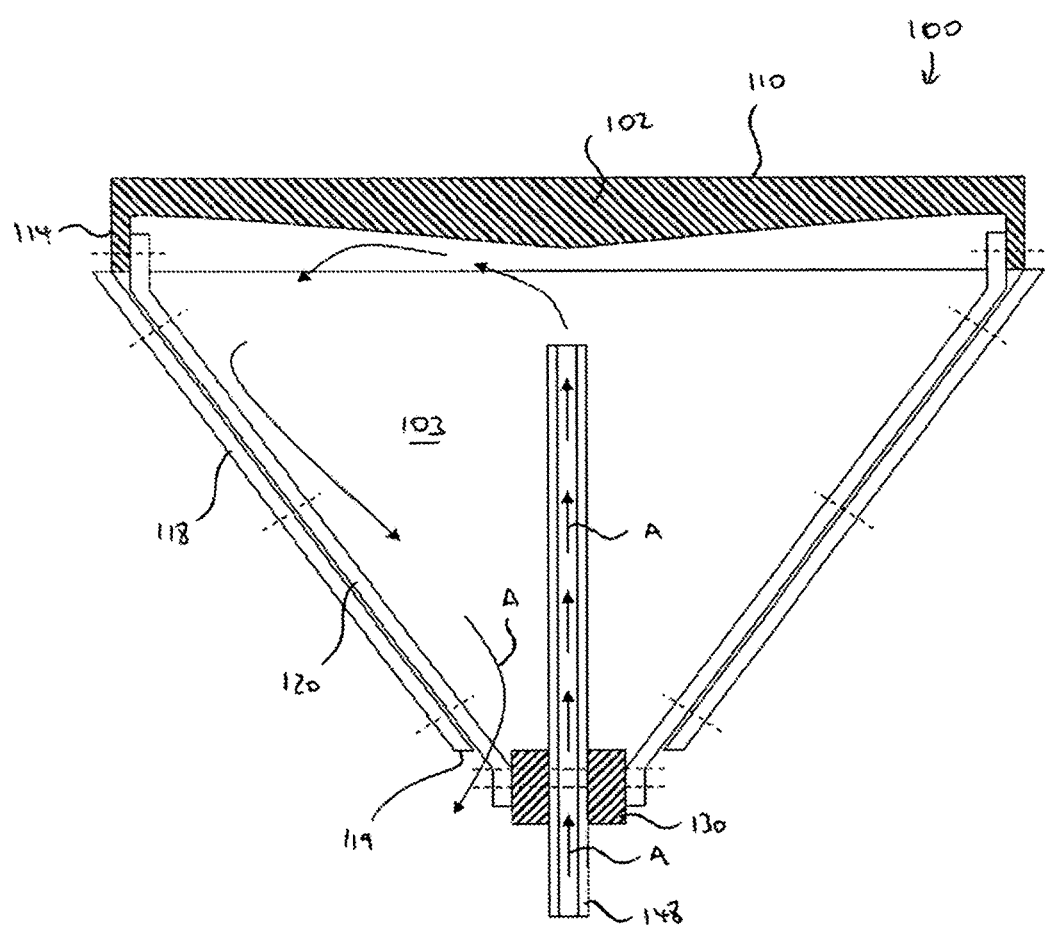
FIG. 2 is a close-up view of the tool element of FIG. 1 showing a fluid flow path.

Turning to FIG. 2, parts of the tool element 100 of FIG. 1 can be seen in more detail. As shown by arrows A, fluid passed through the hot air tube 148 and impinges on the tool block 102. The fluid direction moves through 90 degrees to be generally parallel to the control surface 112 and impinges again, this time on the side walls 114 before circulating back down past the triangular plates 118 and the load beams 120 to exhaust at a gap 121 between each of the load beams 120 proximate the collar 130. The second impingement on the sidewalls 114 also helps heat transfer from the fluid to the tool block 102.

Because the heat transfer coefficient between the fluid from the hot air tube 148 and the tool block 102 will be higher proximate the area where the jet impinges, the increased thickness of the tool block 102 at its central position mitigates this effect with respect to the temperature of the tool surface 110. Conversely, the areas more towards the side walls 114, which will not receive the same amount of thermal power, are thinner and, as such, the temperature at the tool surface 110 is made more consistent.

Figure 3A:
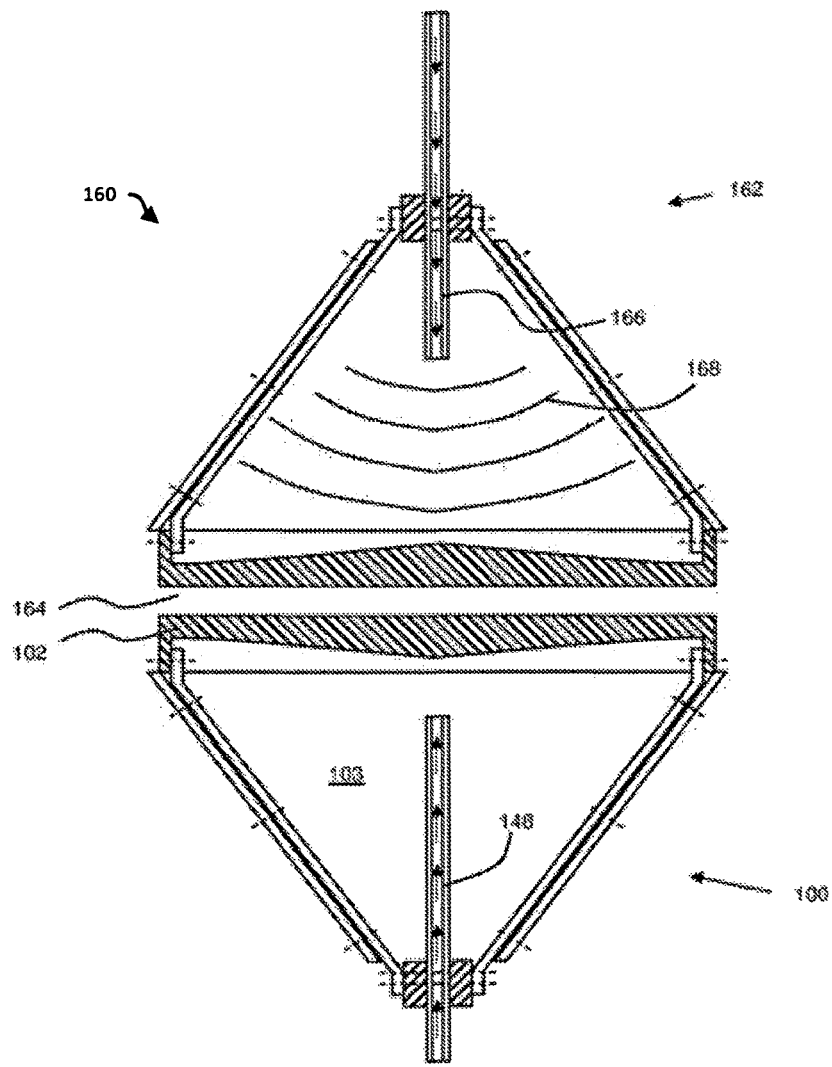
FIG. 3a is a side section view of a part of as first tool comprising a plurality of tool elements in accordance with FIGS. 1 and 2.

Turning to FIG. 3a, a tool 160 is shown comprising two opposing tool elements 100, 162. The correct orientation is shown in FIG. 3a—specifically the tool block 102 is generally horizontal and upward-facing. A tool block 162 of the tool 160 is generally horizontal and downward facing, so a workpiece cavity 164 is defined between the tool elements 100, 162.

In use, as the plenum 103 of the tool element 100 fills, the warmest air will naturally rise towards the tool block 102. As such, heating of the tool block 102 takes place.

Because the tool element 162 is inverted, the warm air will not tend towards the tool block 162 (rather it will rise in the opposite direction). The ability of the fluid to alter the temperature of the element 162 depends on many factors (such as the speed of he impinging air, as well as its temperature, and therefore buoyancy in the surrounding air). In order to account for this, in the embodiment of FIG. 3a, the tubes 148, 166 are axially adjustable. This functionality is provided with an adjustable clamp mechanism (not shown). This allows the system performance and temperature distribution across the blocks 102, 162 to be varied as required.

Turning to FIG. 3b, a tool 150 is shown comprising three tool elements 100, 100' and 100". As can be seen, each of the support rods 108, 108', 108" can be moved axially relative to a support structure 10 such that the tool surface 110 can be varied in height and machined to the desired profile.

When the manufacturing process begins, the opposing mould tool pressing on the workpiece will cause a pressure to be applied to the tool surface 110 in direction P. Due to the presence of the load beams 120, this applied load is transferred to the collar 130 through the support bar 136 into the support flange 138 and into the support rods 108. Thus a load can be successfully reacted without any need to pass through the more fragile heating equipment.

In addition, the provision of the triangular plates 118 forming divergent plenums ensures that the separate chambers are kept out of thermal contact and, as such, adjacent temperatures cannot significantly affect each other. Therefore, each zone can be controlled independently providing that the area below the tool surface is sufficiently vented in order to remove the air therein.

Figure 4A:
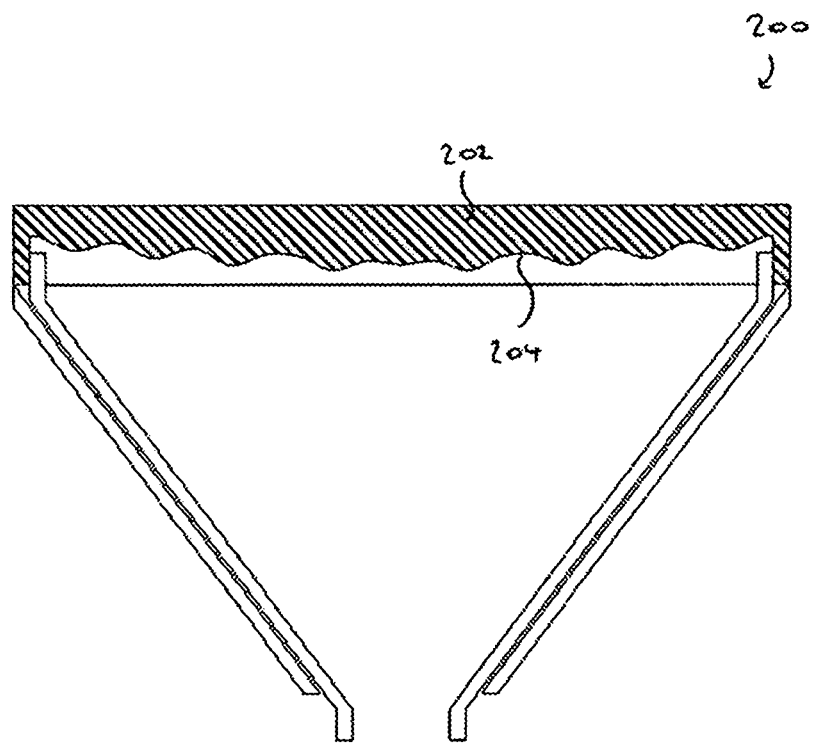
FIG. 4a is a close-up view of a part of a second tool element in accordance with the present invention.

Turning to FIG. 4a, a tool element 200 in accordance with the present invention comprise a tool block 202 having an undulating control surface 204. The increased surface are of the control surface 204 increases heat transfer to or from the working fluid to the tool block.

Figure 4B:
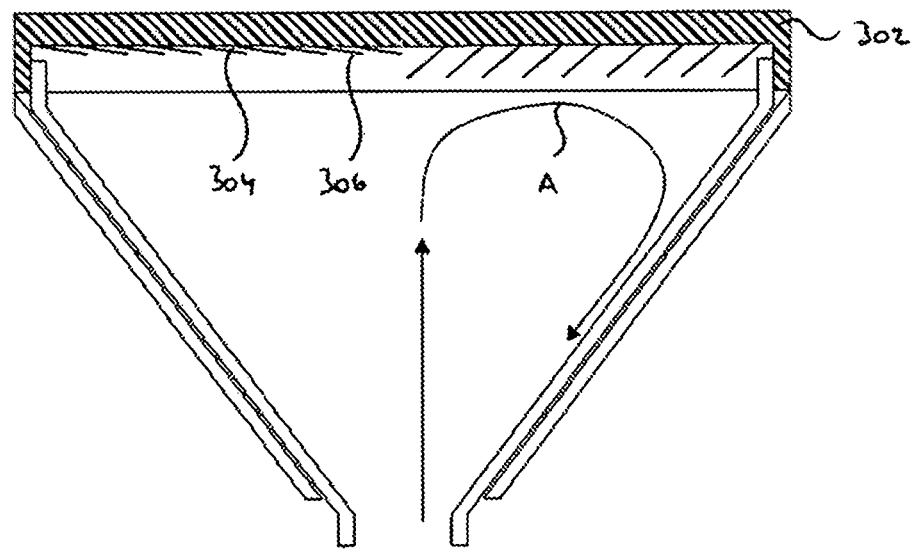
FIG. 4b is a close-up view of a part of a third tool element in accordance with the present invention.

Turning to FIG. 4b, a tool element 300 in accordance with the present invention comprise a tool block 302 having a control surface 304 with deformable ribs 306. The ribs 306 are mounted to the control surface and able to move between a stowed position as shown on the left of FIG. 4b in which they lie substantially flat against the surface 304 and a deployed position as shown on the right of FIG. 4b in which they stand proud of the control surface 304.

Movement of the ribs 306 occurs by virtue of the motion of the heating/cooling fluid moving from the centre to the perimeter of the tool block 302, as shown by arrow A.

Fluid is pumped towards the tool block 302 when the temperature of the block is to be changed. Under these conditions maximum heat transfer between the fluid and the block 302 is desirable. The deployed ribs 306 ensure that the surface area of contact between the fluid and the block 302 is maximised. Furthermore, the presence of the deployed ribs 306 in the flow of fluid disrupts the fluid flow, increasing turbulence which also increases the heat transfer coefficient between the fluid and the block 302.

Alternatively, when the temperature of the block 302 is to remain constant, the flow of fluid can be lessened or stopped. The movement of the ribs 306 to the stowed position lowers the contact area between the fluid and the block 302 thus reducing any conduction therebetween.

Figure 4C:
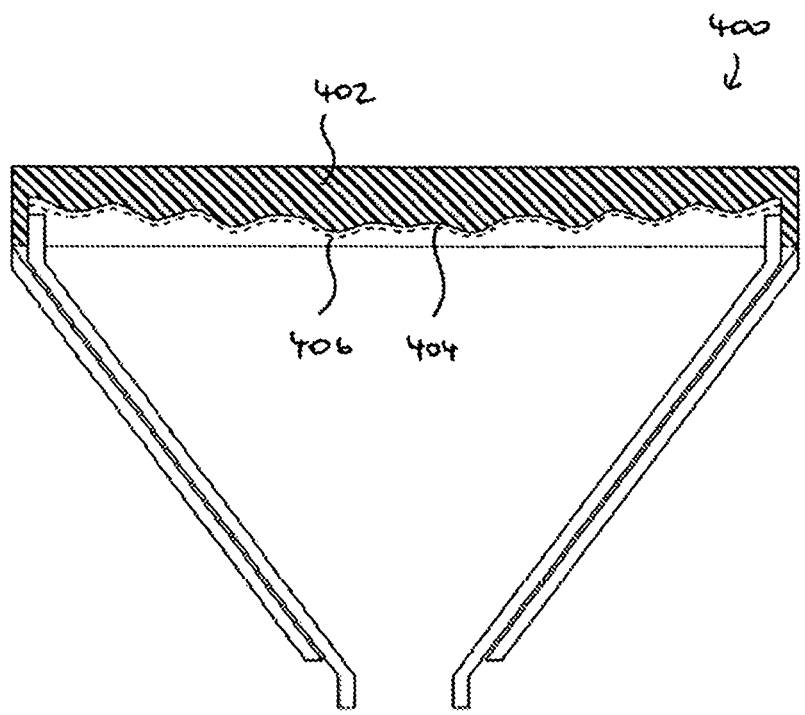
FIG. 4c is a close-up view of a part of a fourth tool element in accordance with the present invention.

Turning to FIG. 4c, a tool element 400 comprises a tool block 402. The tool block 402 has a control surface 404 which comprises undulations per the element 200, with the exception that a high conductivity coating 406 such as copper or gold is provided on the control surface 404. This acts to increase the conduction between the fluid and the tool block 402.

Figure 4D:
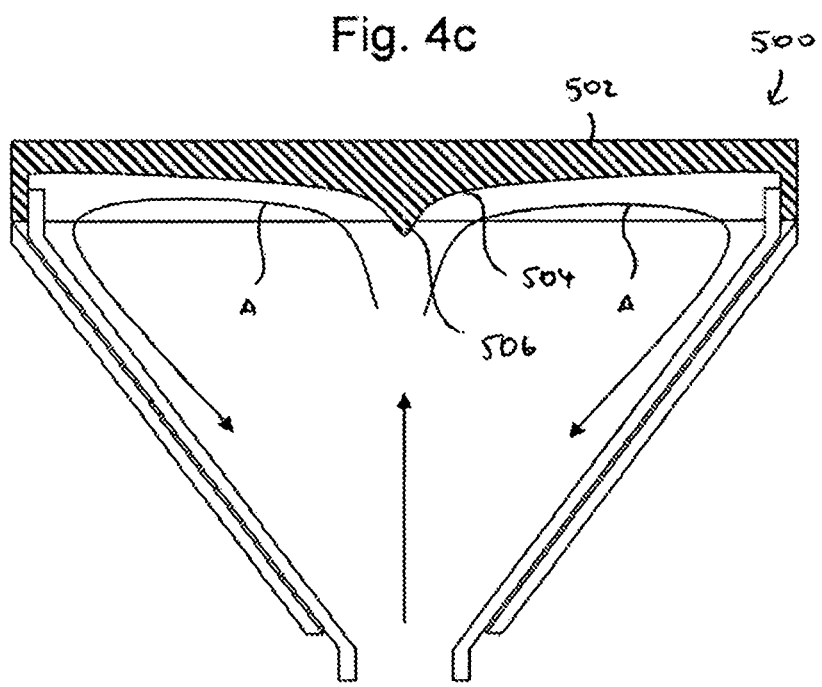
FIG. 4d is a close-up view of a part of a fifth tool element in accordance with the present invention.

Turning to FIG. 4d, a tool element 500 comprises a tool block 502 which has a control surface 504 having a central protrusion 506 which acts to separate and guide the airflow A parallel to the control surface 504 to encourage more even heat transfer with laminar flow.

Figure 4E:
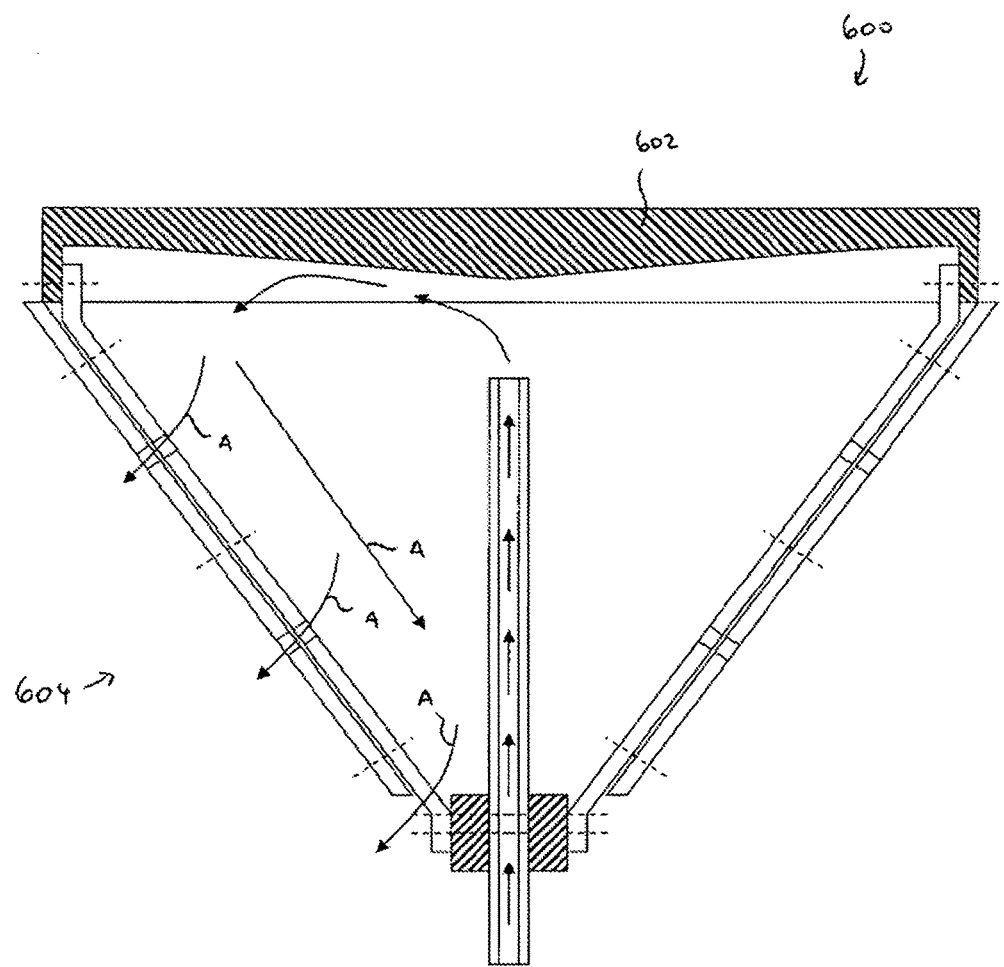
FIG. 4e is a close-up view of a part of a sixth tool element accordance with the present invention.

Turning to FIG. 4e, a tool element 600 comprises a tool block 602 and a support structure 604 similar to structure 104. The main difference is that bores 606 are formed in the structure 604 to permit early escape of the fluid flow A. This acts to quickly remove used fluid from the chamber to increase the thermal agility of the system.

Figure 5:
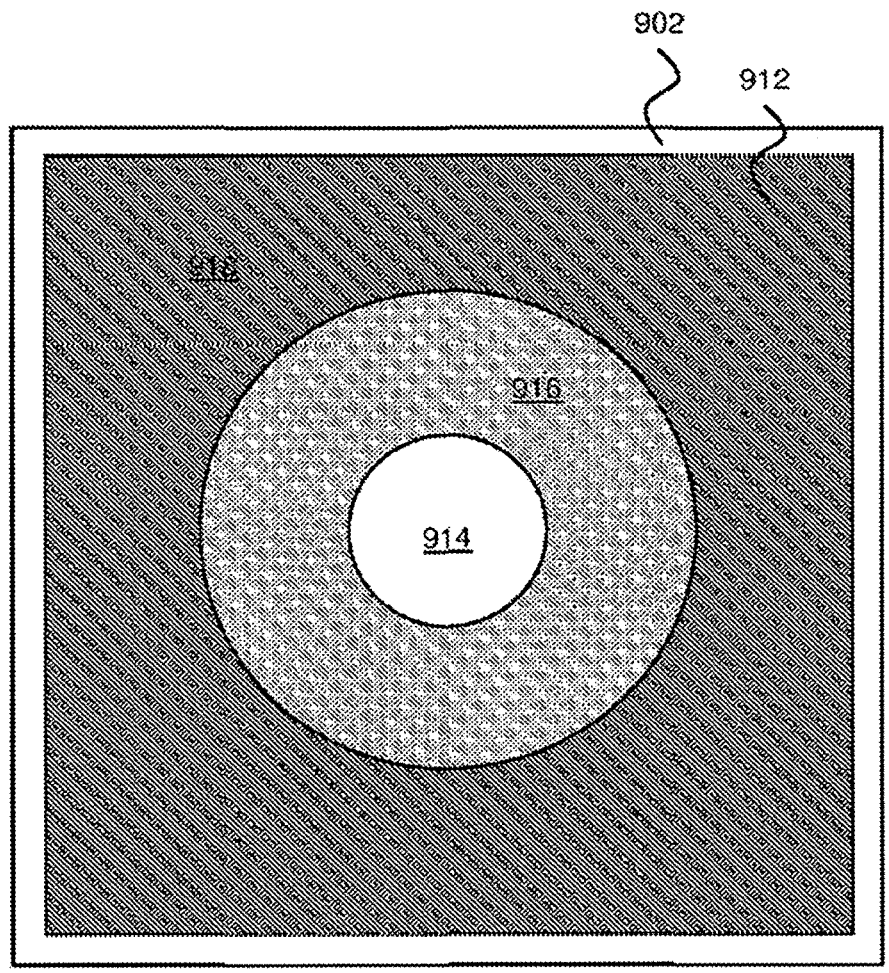
FIG. 5 is a close-up underside view of a part of a seventh tool element in accordance with the present invention.

Referring to FIG. 5, the control surface 912 of a tool element block 902 is shown. The control surface 912 comprises three zones: a central zone 914, an intermediate zone 916 and an outer zone 918. The general concept is that the central zone 914 is configured to have a low heat transfer coefficient (for conduction from the adjacent fluid), the intermediate zone 916 to have an intermediate heat transfer coefficient and the outer zone 918 to have a high heat transfer coefficient. In the embodiment of FIG. 5, the central zone 914 is coated in a highly reflective material, the outer zone 918 in a thermally absorbent material (e.g. graphene) and the intermediate zone 916 in an intermediate material.

For example, the zones may be coated in different paints (the central zone 914 white, the intermediate zone 916 grey and the outer zone 918 black). Alternatively the zones may be coated in materials with differing properties—e.g. the outer zone 918 may be coated in copper or gold.

This arrangement of zones helps the tool face temperature to remain even. The heated fluid will tend to be warmer at the point at which it impinges on the tool block. The amount of thermal energy available will also be "diluted" as is spreads over the area of the tool block towards the extremities. Further, the heat transfer coefficient will be lower as the fluid moves from an impinging course at the centre to a parallel course towards the edges.

Figure 6:
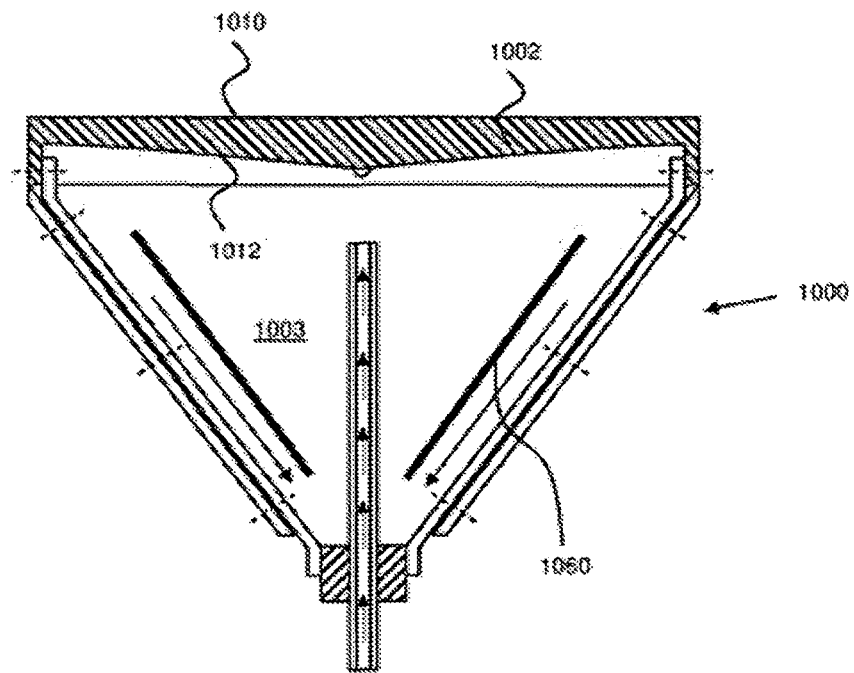
FIG. 6 is a close-up view of a part of a eighth tool element in accordance with the present invention; and, FIG. 7 is a close-up view of a part of a ninth tool element in accordance with the present invention.

Referring to FIG. 6, a tool element 1000 comprises a tool block 1002 having a tool face 1010 and a control surface 1012. The element 1000 defines baffles 1060 which are held in the chamber 1003 by brackets (not shown). The baffles are arranged to encourage a convention cell to form in the chamber 1003 by allowing used fluid to pass down the sides of the chamber 1003 without encountering newly heated air.

Figure 7:
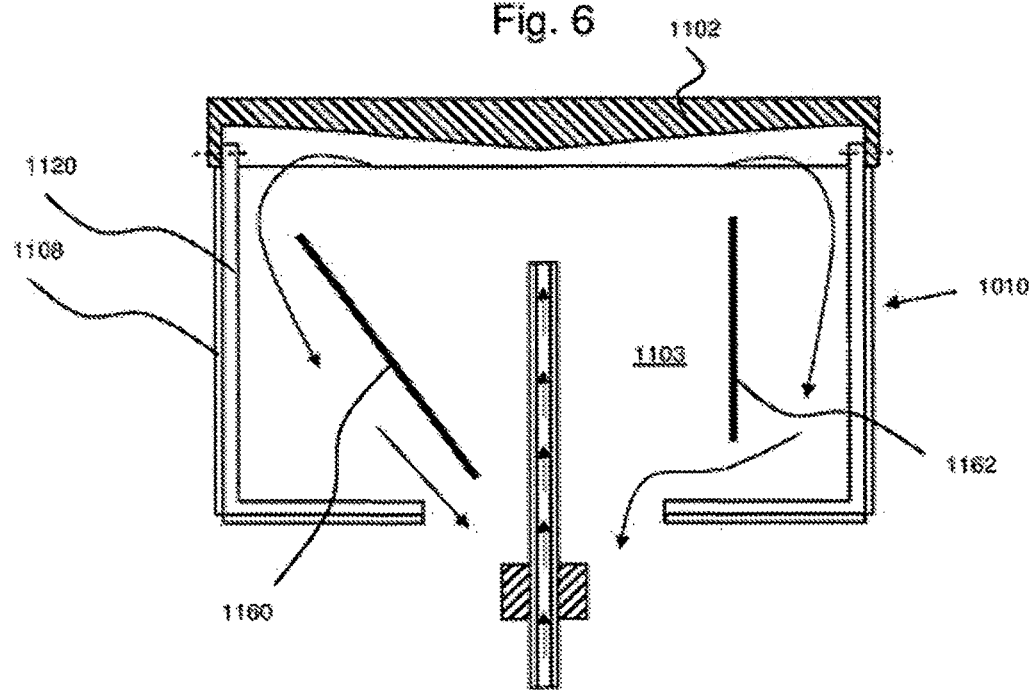

Turning to FIG. 7, a tool element 1100 is shown. The tool element 1100 has a tool block 1102. A cuboid chamber 1103 is defined by panels 1108 and a support structure 1120. As with the above embodiments, the panels 1108 are arranged to define the fluid chamber 1103, and the support structure 1120 reacts loads incident on the tool face.

The left hand side of FIG. 7 shows a baffle 1160 which is similar to the baffles of FIG. 6. The baffle 1160 forms a divergent flow area towards the block 1102 which encourages the heated fluid to spread more evenly. It also provides a side return path for the used fluid, which also insulates the incoming fluid, from the surrounding environment.

The right hand side of FIG. 7 shows a baffle 1162 which is vertical, but performs a similar function to the baffle 1160 in setting up a convention cell within the chamber 1103.

In each of the embodiments of FIGS. 6 and 7, the baffles 1060, 1160, 1162 form may be discrete panel sections, or may form endless loops within the chambers 1003, 1103.

Variations fall within the scope of the present invention. The baffles as shown in FIGS. 6 and 7 may be movable, and even adjustable in use so as to optimise the flow scheme within the relevant chamber.

The support structure 104 does not need to define a pyramid-like structure and may be three-sided triangular, or even hemispherical. The important thing is that a separate temperature zone is defined for each of the tool elements.

The tool itself does not need to be a horizontal type tool as shown in FIG. 3, but may be a rotating mandrel in which each of the support rods 108 is a spoke rotating about a hub, or any other appropriate structure.

The system may be used for cooling as well as heating.

As an alternative to providing a heater integrated with the assembly, an external air supply may be provided with pre-heated or pre-cooled air.

In addition to the air, any other appropriate fluid (an alternative gas or even a liquid) may be used to affect the temperature of the tool blocks 102.

The undulations of FIG. 4a may be replaced by any feature which increases the surface area of the block 202. For example static fins, ribs, corrugations, or channels may be used.

The fins 306 of FIG. 4b may be configured to react to specific temperatures rather than airflow. For example, the fins 306 may comprise heat sensitive elements at their base which deploy the fins at a given temperature to increase heating or cooling. Such heat sensitive elements may be constructed from a material with as high thermal expansion coefficient, whilst the fins are constructed from a highly conductive material which is configured to conduct heat to the block.

The bores shown in FIG. 4e may be formed around the periphery of the plenum chamber, and are preferably not formed in the support bars to avoid weakening thereof.

The invention claimed is:

1. A tool assembly comprising:
   a tool having a tool surface, and a control surface opposite the tool surface;
   a thermal control structure defining a fluid chamber partially bounded by the control surface and a plurality of plates, the fluid chamber comprising a fluid inlet configured for the introduction of a heating/cooling fluid and a fluid outlet, the fluid chamber being defined by walls that diverge towards the control surface; and
   a thermal control assembly comprising a tube that extends from outside the fluid chamber, that defines the fluid inlet into the fluid chamber and that extends into the fluid chamber in a direction toward a central point of the control surface such that the tube directs fluid toward the central point of the control surface, the thermal control assembly containing an electrical resistive air heater configured to heat the heating/cooling fluid flowing into the fluid chamber, wherein the electrical resistive air heater is attached to the tube at a position outside the fluid chamber and has an output entering the tube.

2. A tool assembly according to claim 1 in which the fluid inlet is positioned closer towards the control surface than the fluid outlet.

3. A tool assembly according to claim 1, wherein the tube is axially adjustable relative to the control surface.

4. A tool assembly according to claim 1, wherein the thermal control structure comprises a load path for supporting the tool.

5. A tool assembly according to claim 4, wherein the load path diverges towards the tool to support the tool proximate a periphery of the tool.

6. A tool assembly according to claim 4, wherein the load path comprises a plurality of load beams, each of which is in contact with a respective one of the plurality of plates.

7. A tool assembly according to claim 1, wherein the fluid inlet is directed towards a target position on the control surface, and the tool has a thickness that tapers as it extends away from the target position.

8. A tool assembly according to claim 1, wherein the control surface has features defined thereon to increase a surface area of the control surface.

9. A tool assembly according to claim 8, wherein the features are protrusions.

10. A tool assembly according to claim 9, wherein the protrusions are reactive to a fluid flow thereon to move relative to the control surface.

11. A tool assembly according to claim 9, wherein the protrusions are reactive to temperature to move relative to the control surface.

12. A tool assembly according to claim 1, further comprising a baffle positioned within the fluid chamber arranged to control a course of the heating/cooling fluid flowing within the fluid chamber.

13. A tool assembly according to claim 12, wherein a position of the baffle is adjustable.

14. A tool assembly according to claim 1, wherein the tool comprises a plurality of tool elements that tessellate to define a tool face.

15. A tool assembly according to claim 1, wherein the thermal control structure is constructed from one or more panels defining the walls.

16. A tool assembly according to claim 15, wherein the thermal control structure comprises at least one support member arranged to form a load path for loads incident on the tool.

17. A tool assembly according to claim 16, wherein the support members are load beams in contact with the panels.

18. A tool assembly according to claim 15, wherein the fluid chamber is tapered such that a cross-sectional area of the fluid chamber increases towards the control surface.

19. A tool assembly according to claim 15, further comprising:
   a further thermal control structure defining a further fluid chamber partially bounded by a further control surface, wherein the further thermal control structure is constructed from one or more panels; and
   a further thermal control assembly comprising a further tube extending from outside the further fluid chamber and extending into the further fluid chamber, the further tube defining a further fluid inlet to the further fluid chamber and containing a further electrical resistive air heater configured to heat the heating/cooling fluid flowing into the further chamber.

20. A tool assembly according to claim 1, wherein the fluid chamber is tapered such that a cross-sectional area of the fluid chamber increases towards the control surface.

21. A tool assembly according to claim 1, further comprising:
   a further thermal control structure adjacent the thermal control structure, the further thermal control structure defining a further fluid chamber partially bounded by a further control surface, the further fluid chamber having a further fluid inlet configured for the introduction of the heating/cooling fluid and a further fluid outlet, wherein the further fluid chamber is defined by walls which diverge towards the further thermal control surface; and a further thermal control assembly comprising a further tube extending from outside the further fluid chamber and extending into the further fluid chamber, the further tube defining the further fluid inlet to the further fluid chamber and the further thermal control assembly containing a further electrical air heater configured to heat the heating/cooling fluid flowing into the further chamber, wherein the further electrical resistive air heater is attached to the further tube at a position outside the further fluid chamber and has a further output entering the further tube.

22. A method of manufacturing a workpiece comprising the steps of:

providing a tool element having a tool surface, and a control surface opposite the tool surface; a thermal control structure defining a fluid chamber partially bounded by the control surface and a plurality of plates, the fluid chamber comprising a fluid inlet configured for the introduction of a heating/cooling fluid and a fluid outlet, the fluid chamber being defined by walls that diverge towards the control surface; and a thermal control assembly comprising a tube that extends from outside the fluid chamber, that defines the fluid inlet into the fluid chamber and that extends into the fluid chamber in a direction toward a central point of the control surface such that the tube directs fluid toward the central point of the control surface, the thermal control assembly containing an electrical resistive air heater configured to heat the heating/cooling fluid flowing into the fluid chamber, wherein the electrical resistive air heater is attached to the tube at a position outside the fluid chamber and has an output entering the tube;

providing an opposing tool element, forming the workpiece between the tool element and the opposing tool element.

* * * * *